(12) United States Patent
Wheeler et al.

(10) Patent No.: US 10,384,584 B2
(45) Date of Patent: Aug. 20, 2019

(54) VESSEL

(71) Applicant: CARGO SYSTEMS INC., New York, NY (US)

(72) Inventors: Jasper E. Wheeler, Brooklyn, NY (US); Jeffrey C. Cripe, Brooklyn, NY (US)

(73) Assignee: Cargo Systems, Inc., New York, NY (US)

( * ) Notice: Subject to any disclaimer, the term of this patent is extended or adjusted under 35 U.S.C. 154(b) by 0 days.

(21) Appl. No.: 15/880,095

(22) Filed: Jan. 25, 2018

(65) Prior Publication Data

US 2019/0023168 A1 Jan. 24, 2019

Related U.S. Application Data

(60) Provisional application No. 62/534,682, filed on Jul. 20, 2017.

(51) Int. Cl.
*B60N 3/10* (2006.01)
*B60R 7/04* (2006.01)
(Continued)

(52) U.S. Cl.
CPC ............... *B60N 3/103* (2013.01); *B60R 7/04* (2013.01); *B60R 11/00* (2013.01); *G07F 9/06* (2013.01);
(Continued)

(58) Field of Classification Search
CPC .. B60N 3/103; B60R 7/00; B60R 7/04; B60R 2011/0007; B60R 2011/0059;
(Continued)

(56) References Cited

U.S. PATENT DOCUMENTS

| | | | |
|---|---|---|---|
| 3,873,010 A | | 3/1975 | Patterson |
| 5,489,054 A | * | 2/1996 | Schiff .................... B60N 3/002 224/281 |

(Continued)

FOREIGN PATENT DOCUMENTS

| | | |
|---|---|---|
| ID | 000001930 | 4/2018 |

OTHER PUBLICATIONS

International Search Report for Application No. PCT/US2019/013975.

*Primary Examiner* — Mark R Wendell
(74) *Attorney, Agent, or Firm* — Fishman Stewart PLLC

(57) ABSTRACT

A vessel for a vehicle may include a housing configured for connection with said vehicle and configured to receive a plurality of consumer items. The vessel may include a cover connected to the housing. The cover may include a closed position in which the cover restricts vehicle occupant access to the plurality of consumer items and/or may include an open position in which the cover permits vehicle driver access to the plurality of consumer items. A width of the housing may be less than or substantially equal to a distance between seats of said vehicle. A vessel may include a connecting member connected to the housing and configured to connect the housing with a center console of said vehicle. A vessel may include one or more lights disposed in the housing and configured to illuminate the plurality of consumer items.

21 Claims, 10 Drawing Sheets

(51) Int. Cl.
*G07F 11/52* (2006.01)
*G07F 9/06* (2006.01)
*B60R 11/00* (2006.01)
*H02J 7/00* (2006.01)

(52) U.S. Cl.
CPC ....... *G07F 11/52* (2013.01); *B60R 2011/0007* (2013.01); *B60R 2011/0059* (2013.01); *B60R 2011/0094* (2013.01); *H02J 2007/0062* (2013.01)

(58) Field of Classification Search
CPC ....... B60R 2011/0094; B60R 2011/005; G07F 11/52; H02J 2007/0062
USPC ............ 297/188.01, 188.06, 188.07, 188.12, 297/188.13, 188.14, 188.18, 188.19, 297/188.2
See application file for complete search history.

(56) References Cited

U.S. PATENT DOCUMENTS

| | | | |
|---|---|---|---|
| 6,216,927 B1* | 4/2001 | Meritt | B60R 11/02 224/275 |
| 9,156,407 B1* | 10/2015 | Kramer | B60R 7/04 |
| 9,227,571 B1 | 1/2016 | Wilkens | |
| 2007/0063553 A1* | 3/2007 | Lilov | B60R 7/04 297/188.17 |
| 2012/0074741 A1* | 3/2012 | Andersson | B60N 3/101 297/188.14 |
| 2015/0035308 A1* | 2/2015 | Huebner | B60R 7/04 296/37.8 |
| 2015/0310532 A1 | 10/2015 | Gura et al. | |
| 2016/0247212 A1 | 8/2016 | Shimmerlik et al. | |
| 2017/0246989 A1* | 8/2017 | Ben Abdelaziz | B60Q 3/20 |
| 2018/0037169 A1* | 2/2018 | Dunham | B60Q 3/225 |
| 2018/0056887 A1* | 3/2018 | Salter | B60Q 3/225 |

* cited by examiner

US 10,384,584 B2

VESSEL

CROSS-REFERENCE TO RELATED APPLICATION

This application claims the benefit of U.S. Provisional Patent Application Ser. No. 62/534,682, filed on Jul. 20, 2017, the disclosure of which is hereby incorporated herein by reference in its entirety.

TECHNICAL FIELD

The present disclosure generally relates to vessels, including vessels and storage containers that may be used in connection with vehicles, such as automobiles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Storage space in vehicles may be limited or finite, and may be dictated by built-in, fixed, and/or vehicle specific solutions.

Vehicles, such as taxis and other for-hire vehicles, often transport occupants, such as drivers and/or passengers. Occupants may have a need or desire for one or more consumer items (e.g., food, beverages, electrical devices, paper products, cosmetics, etc.) that may not typically be available in such vehicles.

Some containers that may store consumer items, such as vending machines, may have a limited number of slots or sections that may limit the number or type of consumer items that can be stored. Vending machines and other containers may be relatively complex and involve springs or other actuation devices to move items internally and that may require complicated maintenance and/or resupplying processes.

There is a desire for solutions/options that minimize or eliminate one or more challenges or shortcomings of vessels, vehicles, and/or vehicle seat assemblies. The foregoing discussion is intended only to illustrate examples of the present field and should not be taken as a disavowal of scope.

SUMMARY

A vessel for a vehicle may include a housing that may be configured for connection with said vehicle and configured to receive a plurality of consumer items. The vessel may include a cover connected to the housing. The cover may include a closed position in which the cover restricts vehicle occupant (e.g., driver and/or passenger) access to the plurality of consumer items and/or may include an open position in which the cover permits vehicle driver access to the plurality of consumer items. Restricting vehicle occupant access may include preventing access by a driver and by passengers. In the open position of the cover, the cover may restrict vehicle passenger access to said plurality of consumer items. The plurality of consumer items may include at least ten different consumer items, may include hundreds of consumer items, or greater or fewer consumer items. A width of the housing may be less than or substantially equal to a distance between seats of said vehicle. A vessel may include a connecting member connected to the housing and configured to connect the housing with a center console of said vehicle. A vessel may include one or more lights disposed in the housing and configured to illuminate the plurality of consumer items. A vessel may include a light sensor. One or more lights may illuminate the plurality of consumer items if an amount of light sensed by the light sensor is below a threshold and the one or more lights may not illuminate the plurality of consumer items if the amount of light sensed by the light sensor is not below the threshold.

A housing of a vessel may include one or more charging ports. A vessel may include a plurality of adjustable dividers disposed in the housing. An adjustable divider may be configured to divide the housing into a plurality of chambers or sections configured to receive one or more of the plurality of consumer items. At least one of the plurality of adjustable dividers may be configured to engage a housing. An adjustable divider may include a recess configured to at least partially receive a protrusion of the housing. The protrusion of the housing may correspond to a mounting location of a connecting member. The housing may not include any springs. A width of the housing may be less than or substantially equal to a distance between seats of a vehicle, a height of the housing may be less than the width of the housing, and/or a length of the housing may be greater than the width and the height of the housing. A housing may include a tapered end that may include a smaller height than a remainder of the housing. A vessel may include a circuit board, one or more charging ports, and/or one or more lights that may be disposed in the tapered end of the housing.

A vessel for a vehicle may include a housing that may be configured for connection with said vehicle and may be configured to receive a plurality of consumer items. The vessel may include a cover connected to the housing. The cover may include a closed position in which the cover restricts vehicle occupant access to the plurality of consumer items and/or may include an open position in which the cover permits vehicle driver access to the plurality of consumer items. A vessel may include a circuit board connected to the housing and/or a wireless communication device connected to the circuit board. A wireless communication device may be configured to provide wireless communication between the circuit board and one or more remote and/or mobile electronic devices. The one or more remote and/or mobile electronic devices may include a mobile electronic device of an occupant of said vehicle. The one or more remote and/or mobile electronic devices may include a mobile electronic device of a passenger of said vehicle, a mobile electronic device of a driver of said vehicle, and/or a remote computer server.

A vessel may include a first sensor configured to sense a position of the cover, a second sensor connected to the housing and configured to sense a position of the housing, a temperature sensor connected to the housing configured to determine an internal temperature of the housing, and/or a camera connected to the housing and configured to obtain at least one of images and video of the plurality of consumer items.

A seat assembly for a vehicle may include a first seat, a second seat, a console disposed at least partially between the first seat and the second seat, and/or a vessel connected to the console. The vessel may include a housing that may be configured for connection with said console and may be configured to receive a plurality of consumer items. The vessel may include a cover connected to the housing. The cover may include a closed position in which the cover restricts vehicle occupant access to the plurality of consumer items and/or an open position in which the cover permits vehicle driver access to the plurality of consumer items. The vessel may be connected to rotate with a lid of the console. The housing may include a circuit board, one or more charging ports, and/or one or more lights.

The foregoing and other aspects, features, details, utilities, and/or advantages of embodiments of the present disclosure will be apparent from reading the following description, and from reviewing the accompanying drawings.

DETAILED DESCRIPTION

Figure 1:
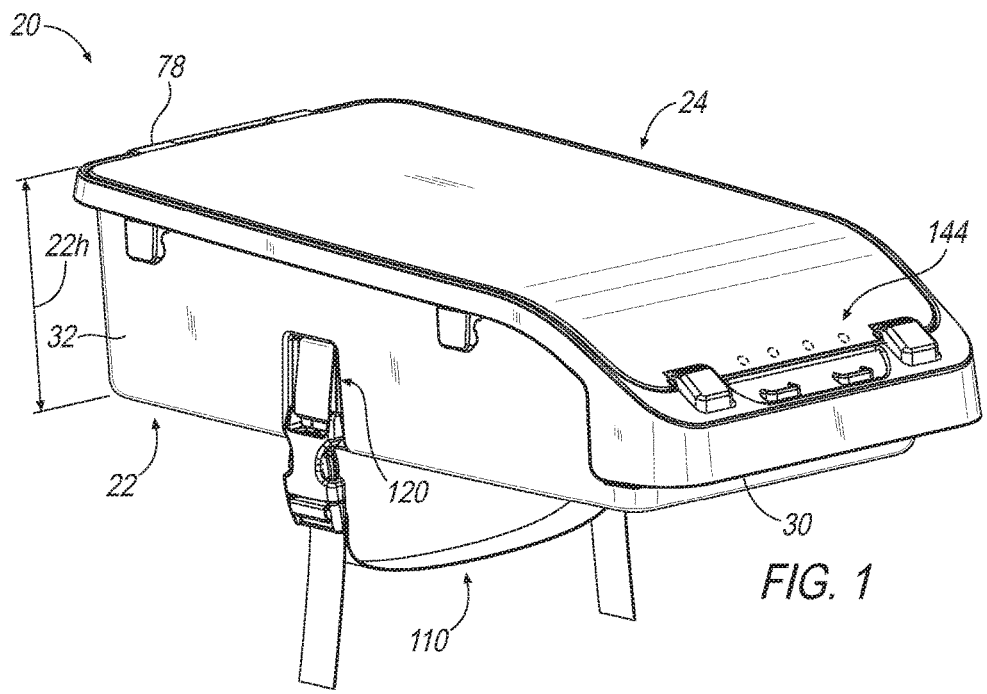
FIGS. 1-4 are perspective views generally illustrating embodiments of vessels according to teachings of the present disclosure.
Figure 2:
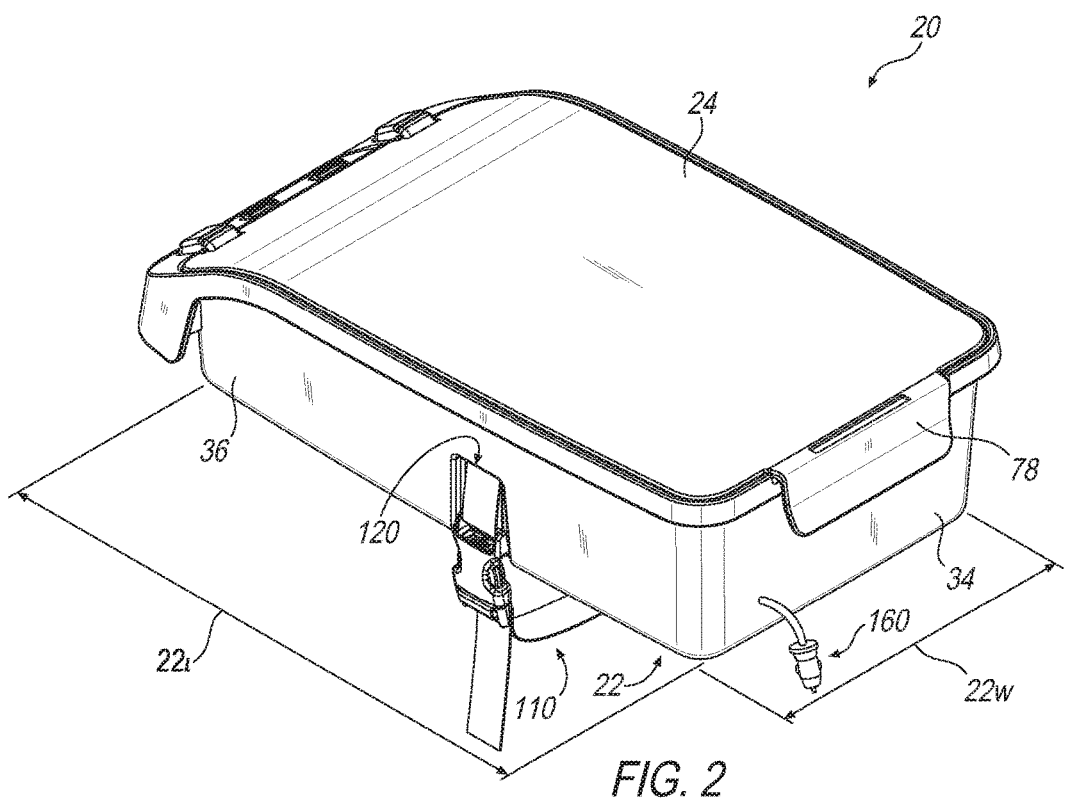
Figure 3:
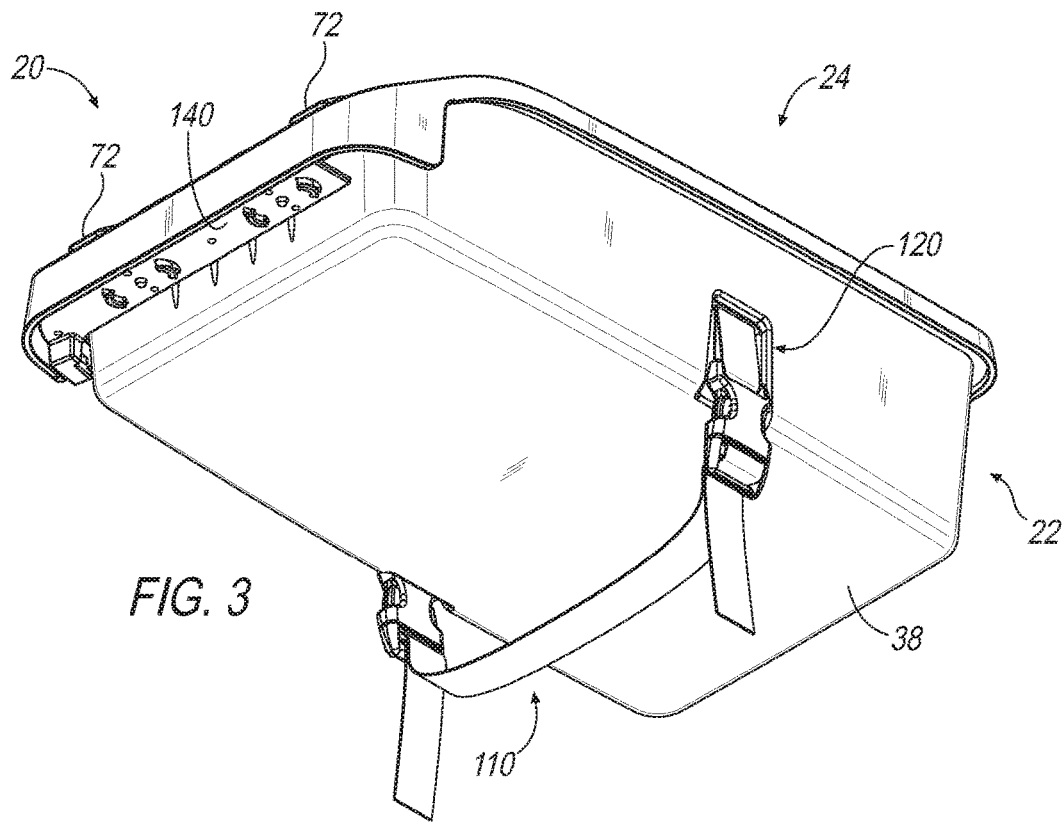
Figure 4:
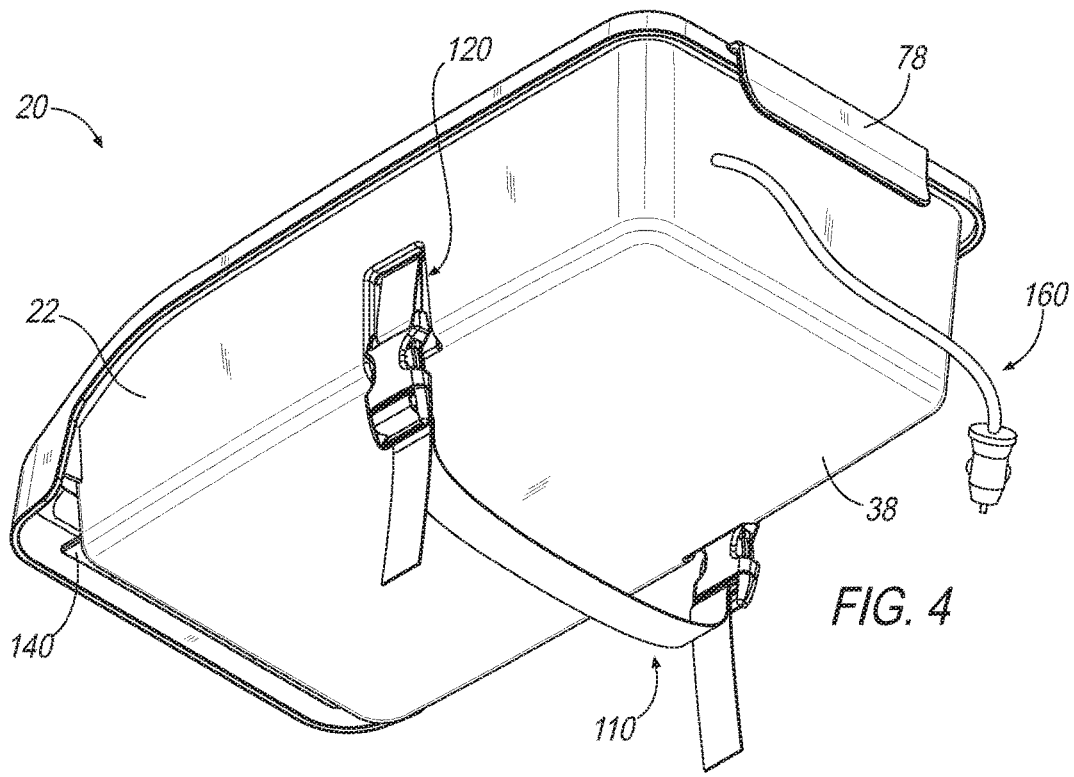

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

In the embodiments, such as generally illustrated in FIGS. 1-10, a vessel 20 may include a housing 22 and/or a cover 24. A housing 22 may include one or more walls, such as a first wall 30, a second wall 32, a third wall 34, a fourth wall 36, and/or a fifth wall 38. The first wall 30 and the third wall 34 may be disposed in parallel with each other. The second wall 32 and the fourth wall 36 may be disposed in parallel with each other and/or perpendicular to the first wall 30 and the third wall 34. The first wall 30, the second wall 32, the third wall 34, and/or the fourth wall 36 may be connected together to provide a generally rectangular configuration. The fifth wall 38 may be connected to and/or disposed perpendicular to the first wall 30, the second wall 32, the third wall 34, and/or the fourth wall 36. The fifth wall 38 may, for example, be configured as a bottom or base wall of the housing 22. The first wall 30, the second wall 32, the third wall 34, the fourth wall 36, and/or the fifth wall 38 may cooperate to provide a chamber 40. While the vessel 20 is described and illustrated in connection with a rectangular configuration, vessels 20 may include other configurations, such as a circular configuration, among others.

Figure 11:
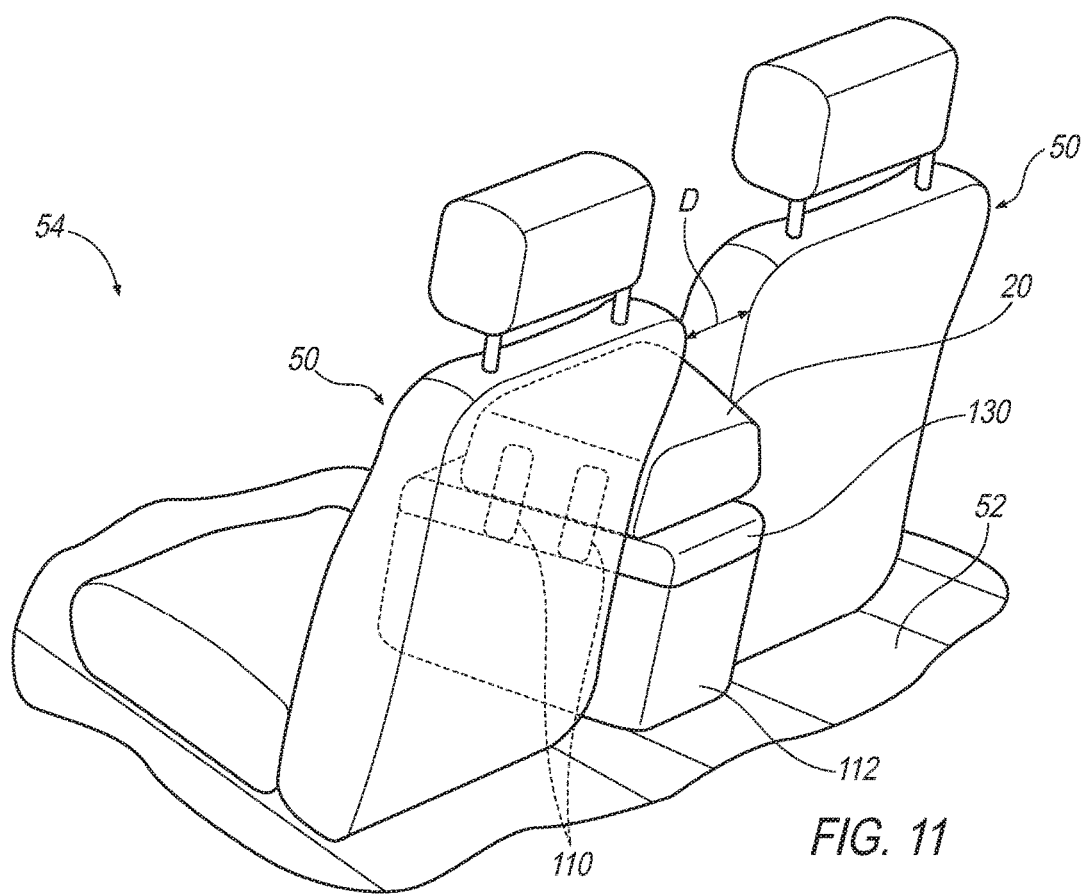
FIG. 11 is a perspective view generally illustrating an embodiment of a vehicle seat assembly according to teachings of the present disclosure.

As shown in the embodiments, a housing 22 may include a length 22l, a width 22w, and a height 22h. A housing 22 may be utilized in connection with a vehicle seat assembly 54 and/or may be configured to be disposed at least partially between (e.g., laterally) seats 50 in a vehicle 52 (see, e.g., FIG. 11). For example and without limitation, the width 22w of the housing 22 may be about the same as or less than a distance D between vehicles seats 50, which may be about 12 inches, more than 12 inches, and/or less than 12 inches. A height 22h of the housing 22 may be less than the width 22w of the housing 22, and/or a length 22l of the housing 22 may be greater than the width 22w and/or the height 22h of the housing 22.

In the embodiments, a housing 22 may include one or more tapered portions. For example, a first end 62 (e.g., a rear end) of the housing 22 may include a tapered portion 60 that may taper from the top and/or from the bottom, which may include the first wall 30 and/or portions of the second wall 32 and the fourth wall 36 having smaller heights than a remainder of the housing 22 (e.g., smaller than other portions of the second wall 32 and fourth wall 36 and/or smaller than the third wall 34). A housing 22 may include an overhang portion 64 that may extend (e.g., longitudinally outward) from the first wall 30.

In the embodiments, a housing 22 may include one or more of a variety of materials. For example and without limitation, a housing 22 may include plastic, rigid plastic, wire, rigid wire, wire mesh, fabric, foam, rubber, ceramic, metal, and/or polymers, among others.

A vessel 20 may include a cover 24 that may be pivotably connected to a housing 22. The cover 24 may be selectively connected to the housing 22, such as via resting on top of the housing 22, being tethered to the housing 22, and/or being hinged to the housing 22. A first end 70 of the cover 24 may be selectively connected to the housing 22 at or about the first end 62 of the housing 22. For example and without limitation, the housing 22 may include one or more connectors 72 (e.g., clips) that may be disposed at or about the overhang portion 64 and that may be configured for connection with corresponding features 74 (e.g., apertures or recesses) of the cover 24. A second end 76 of the cover 24 may be connected to the housing 22 via a flange 78 that may be at least partially integrated with the cover 24. The flange 78 may be releasable such that the flange 78 may snap into and out of engagement with the housing 22. The flange 78 may include one or more protrusions or teeth 78a that may be configured to engage (e.g., snap into and out of engagement with) the housing 22 (see, e.g., FIG. 12). If all of the connectors 72 are disconnected and the flange 78 is disconnected from the housing 22 (e.g., by a driver of a vehicle 52), the cover 24 may be completely disconnected from the housing 22 (e.g., without any tools or keys). The flange 78 may facilitate opening of the vessel 20 by a driver and/or the process of opening the cover 24 may not involve any tools or keys. With some embodiments, the connectors 72 may permanently connect the cover 24 to the housing.

A cover 24 may include one or more of a variety of shapes, sizes, configurations, and/or materials. For example, a cover 24 may include a clear material and/or an at least semitransparent material (e.g., a rigid plastic), which may permit viewing of at least some of the contents of the chamber 40 even when the cover 24 is in a closed position. Additionally or alternatively, the cover 24 may include wire, rigid wire, wire mesh, fabric, foam, rubber, ceramic, metal, polycarbonate, and/or polymers, among others. For example and without limitation, the cover 24 may include an opaque material that may at least partially restrict viewing of the contents of the chamber 40. The cover 24 may include an angled portion 80 that may correspond to and/or be aligned with a tapered portion 60 of the housing 22. An angled portion 80 of the cover 24 and/or a tapered portion 60 of the housing 22 may improve visibility of items 90 in the chamber 40. In embodiments, the vessel 20 may be relatively flat and/or may be tapered or angled away from an occupant (e.g., toward a front of the vessel 20 and a front of the vehicle 52).

Figure 6:
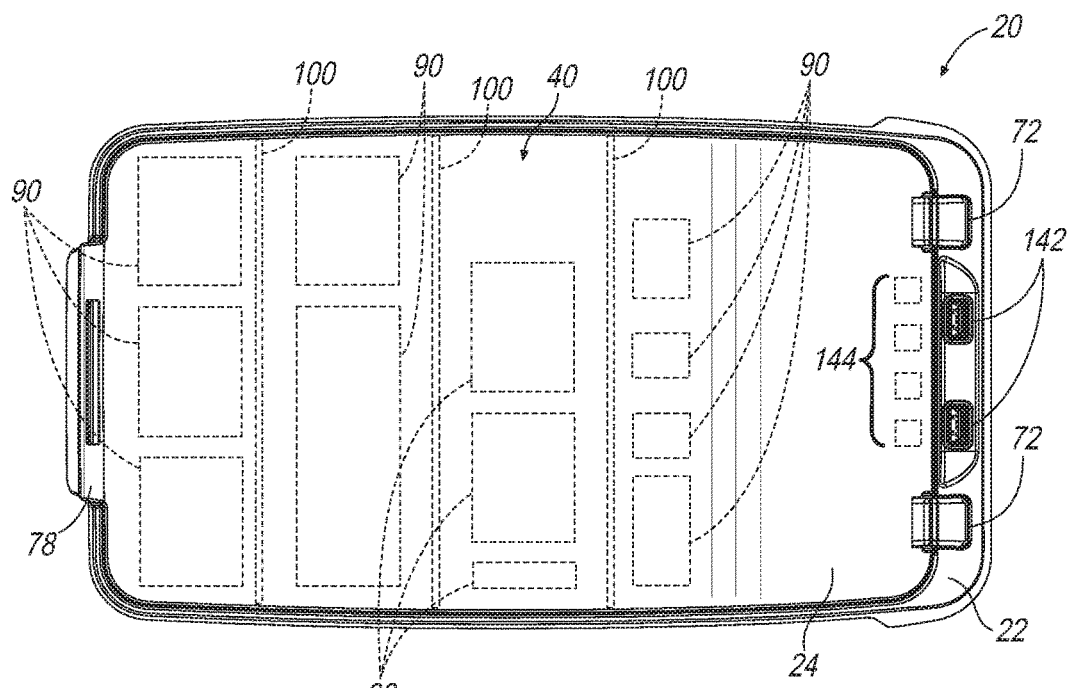
FIG. 6 is a top view generally illustrating an embodiment of a vessel according to teachings of the present disclosure.
Figure 7:
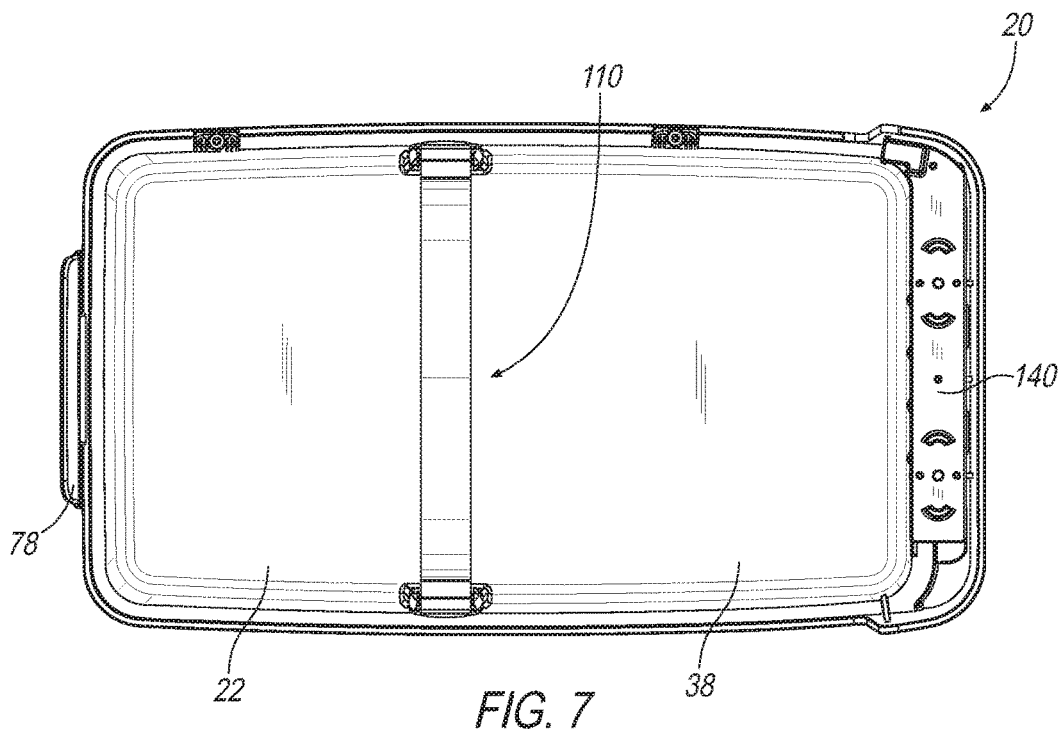
FIG. 7 is a bottom view generally illustrating an embodiment of a vessel according to teachings of the present disclosure.
Figure 8:
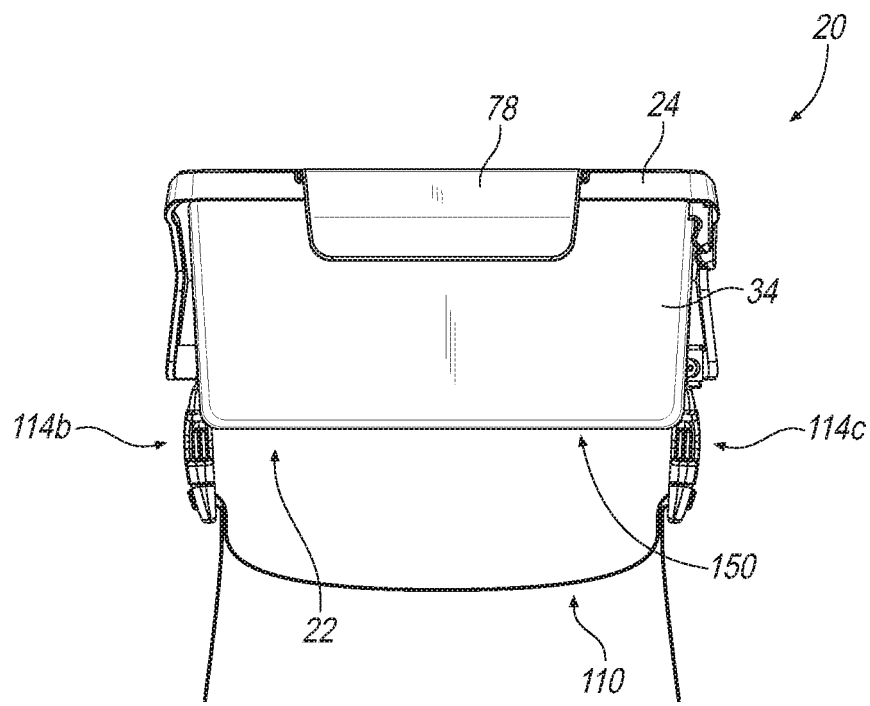
FIG. 8 is a front view generally illustrating an embodiment of a vessel according to teachings of the present disclosure.
Figure 9:
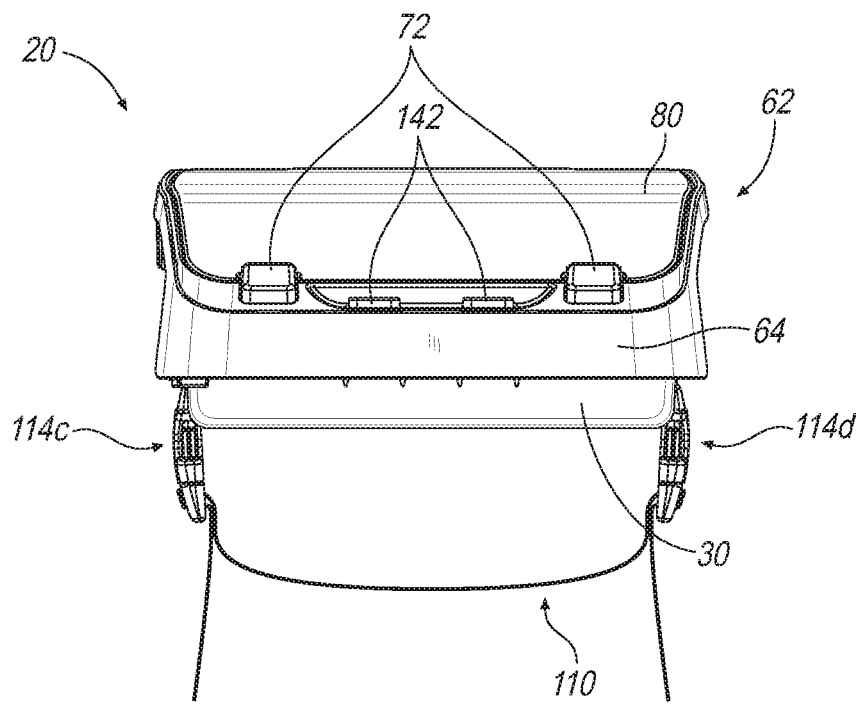
FIG. 9 is a rear view generally illustrating an embodiment of a vessel according to teachings of the present disclosure.

A chamber 40 of a housing 22 may, for example and without limitation, be configured to receive one or more items 90, such as consumer items (see, e.g., FIG. 6). Consumer items may include one or more of a variety of items. For example and without limitation, consumer items may include food products (e.g., snacks, chips, cookies, nuts, fruit, gum, etc.), electrical components (e.g., charging cables, batteries, adapters, etc.), paper products (e.g., tissues, wipes, diapers, etc.), writing utensils (pencils, pens, crayons, markers, etc.), beverages, cosmetics, and/or other items. A housing 22 may be configured to receive a plurality of different types of items 90 that may include different shapes. For example and without limitation, a housing 22 may be configured to receive more than five types of items, more than ten types of items, and/or a greater or lesser number of items. The items 90 may be stacked, such as vertically, horizontally, or both horizontally and vertically. Some items 90 may be stacked vertically and some items 90 may be stacked horizontally within the same housing 22.

A housing 22 may include one or more dividers 100 that may be configured to separate the chamber 40 into a plurality of chambers or sections. A divider 100 may extend from one side of the housing to another side of the housing (e.g., from the second wall 32 to the fourth wall 36 and/or from the first wall 30 to the third wall 34). A divider 100 may be adjustable and/or may be connected to a housing 22 in a plurality of different positions or orientations. A divider 100 may include, for example and without limitation, at least semitransparent rigid plastic. The divider 100 could be connectable to one another to form an assembly. The housing 22 may include one or more grooves or channels 102 that may be configured for engagement with (e.g., to at least partially receive) the divider(s) 100.

As generally illustrated in FIGS. 1-5 and 7-12, a vessel 20 may include one or more connecting portions or members 110 that may be configured for connecting a vessel 20 with another component or surface, such as a vehicle 52. A connecting member 110 may include, for example and without limitation, a strap that may be configured for connection with a center console 112 of a vehicle 52. The connecting member 110 may include one or more connectors (e.g., connectors 114a, 114b, 114c, 114d) that may connect the connecting member 110 with the housing 22 and/or may connect portions of the connecting member 110 together. A connector (e.g., connectors 114a, 114b, 114c, 114d) may include one or more of a variety of shapes, sizes, configurations, and/or materials. For example and without limitation, a connector may include a clip and/or a buckle.

A housing 22 may include one or more external recessed portions 120 that may be configured for connection with a connecting member 110 and/or for receiving at least a portion of a connector (e.g., connectors 114a, 114b). An external recessed portion 120 may correspond to an internal protrusion 122 of the housing 22. An external recessed portion 120 and/or an internal protrusion 122 may correspond to a mounting location of a connecting member 110. One or more dividers 100 may include a recess or recesses 124 that may be configured to at least partially receive an internal protrusion 122. A connecting member 110 may include, for example and without limitation, flexible webbing. The connecting member(s) 110 may extend around the center console 112 or a portion thereof (e.g., a lid 130 of the center console 112) to connect the housing 22 to the center console 112. The connecting member(s) 110 may be thin enough to permit the center console lid 130 to close and/or latch. If a vessel 20 is connected to a lid 130 of a center console 112, the vessel 20 may rotate with the lid 130 of the center console 112 and the inside of the center console 112 may remain accessible (e.g., to the driver) even while the vessel 20 is connected. The connecting member(s) 110 and/or the connectors (e.g., connectors 114a, 114b, 114c, 114d) may permit the vessel 20 to be connected to and/or disconnected from the center console 112 quickly and/or without any tools or keys.

Figure 5:
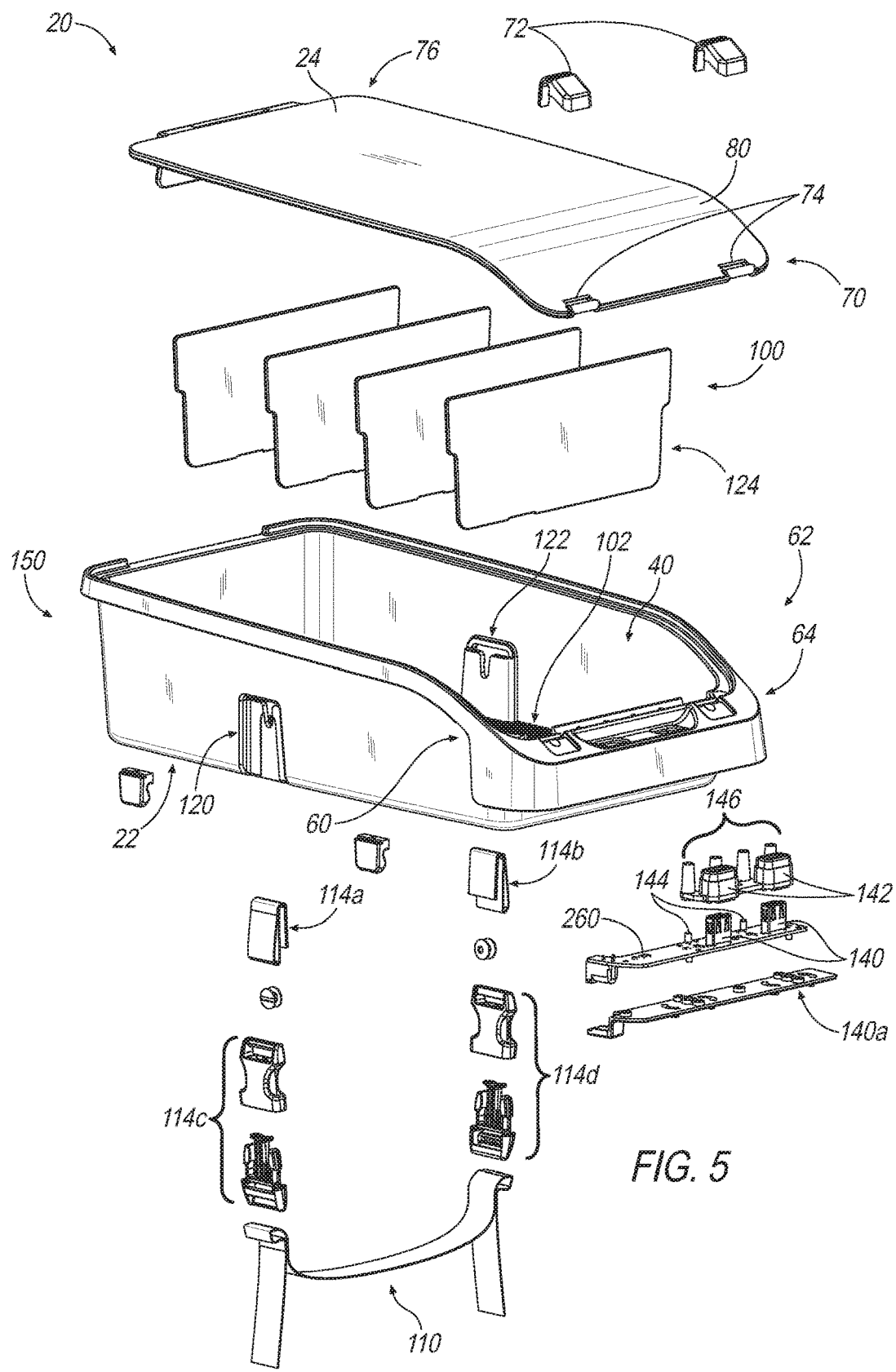
FIG. 5 is an exploded perspective view generally illustrating an embodiment of a vessel according to teachings of the present disclosure.

In the embodiments, such as generally illustrated in FIGS. 3-5 and 7, a vessel 20 may include one or more circuits and/or circuit boards 140. Such as generally illustrated in FIGS. 1, 2, 5, 6, 9, and 10, a vessel 20 may include one or more charging ports 142. Additionally or alternatively, such as generally illustrated in FIGS. 1, 5, and 6, a vessel 20 may include one or more lights 144. The one or more circuit boards 140 may control operation of and/or the power provided to the one or more charging ports 142 and/or the one or more lights 144. The circuit board(s) 140 may be disposed in and/or connected to an overhang portion 64 of the housing 22 and/or may, in an assembled configuration, only be visible from a bottom of the housing 22. A circuit board 140 may include one or more light pipes 146 that may be configured to direct light from the light(s) 144 toward the chamber 40 and/or the charging port(s) 142. A circuit board cover 140a may be connected to a circuit board 140 and/or may be configured to cover at least portion (e.g., a bottom) of the circuit board 140.

In the embodiments, the one or more charging ports 142 may include one or more of a variety of configurations. For example and without limitation, a charging port 142 may include a 110 volt outlet, a 220 volt outlet, a USB (universal serial bus) port, a Lightning connector (e.g., a cable connected to a circuit board 140 at a first end and having a Lightning connector at a second end), and/or a wireless charging pad or portion, among others. A charging port 142 may be disposed at, about, and/or in an overhang portion 64 of the housing 22. Additionally or alternatively, a charging port 142 may be disposed at or about a front end 150 of the vessel 20, such as for use by a driver. The one or more charging ports 142 may be connected to the circuit board(s) 140 and/or a power source. The one or more lights 144 may include, for example and without limitation, LEDs (light emitting diodes) that may include one or more of a variety of colors. The one or more lights 144 may be configured to provide light to and/or illuminate the chamber 40 of the housing 22 and/or at least some of the items 90 that may be disposed in the chamber 40. The one or more lights 144 may be disposed at or about the first end 62 of the housing (e.g., at a top of the first wall 30), the sides of the housing (e.g., the second wall 32, the fourth wall 36), the front end 150 of the housing 22 (e.g., the third wall 34), and/or the bottom of the housing 22 (e.g., the fifth wall 38).

A vessel 20 may be configured for connection with a power source, such as a vehicle power source, a battery, a solar unit, a generator, and/or some other power source. A vessel 20 may include a power cord 160 (see, e.g., FIGS. 2, 4, and 12) that may be connected, directly and/or indirectly, to one or more circuit boards 140, one or more charging ports 142, and/or one or more lights 144. The power cord 160 may be configured for connection with a power port of a vehicle 52, such as a 12-volt port (e.g., for a vehicle cigarette lighter receptacle), a 110-volt port, and/or a 220-volt port, among others. Additionally or alternatively, a vessel 20 may be configured for wireless charging and/or may include a wireless power connection that may be configured to receive and/or provide power. The housing 22 may include one or more cable retainers 162 that may be configured to retain portions of the power cord 160 relative to the housing 22.

Figure 13:
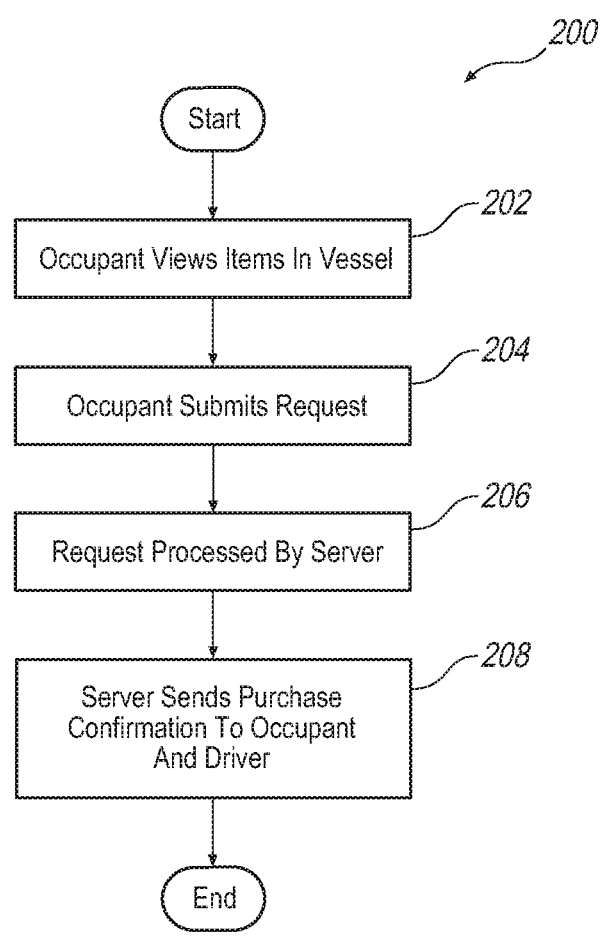
FIG. 13 is a flow diagram of an embodiment of a method of utilizing a vessel according to teachings of the present disclosure.

An embodiment of a method 200 of utilizing a vessel 20 is generally illustrated in FIG. 13. A passenger of a vehicle 52 may view items 90 in a chamber 40 of a vessel 20 and may want to acquire one or more of the items 90 (step 202). A passenger may submit an electronic request to purchase one or more of the items in a vessel 20 (step 204), such as via an electronic device application or app on a mobile electronic device 222 of the passenger (see, e.g., FIG. 14). A mobile electronic device (e.g., devices 222, 224) may include one or more of a variety of devices, such as, for example and without limitation, a smartphone, a smart watch, a tablet computer, and/or a laptop computer, among others. The request may include a unique code associated with the vessel 20. The request may be transmitted to a remote location, such as to a remote computer/server 220 that may process the request (e.g., check for a profile of the passenger) (step 206). The remote computer server 220 may be configured to communicate with a mobile electronic device 224 of the driver. If the transaction is approved, such as by the remote computer server 220 after approval of a credit or debit card or account, the computer server 220 may send a purchase confirmation to the mobile electronic devices 222, 224 of the occupant and/or the driver (step 208), which may indicate that the driver may retrieve the selected item(s) 90 from the vessel 20 and provide the item(s) 90 to the passenger. In some circumstances, the driver may purchase one or more items 90 from a vessel 20 for personal use.

A cover 24 of a vessel 20 may selectively restrict access to a chamber 40 of a housing 22. The cover 24 may be controlled by a system (such as a lock) that prevents entry to the vessel 20. In a closed position of the cover 24, such as generally illustrated in FIGS. 1-4, 6, 8, 9, and 10, the cover 24 may prevent access by all vehicle occupants, including a driver and any passengers, to the chamber 40 and any items 90 therein. Items 90 in the chamber 40 may not be accessible in any other way. For example and without limitation, apart from access via opening or removal of the cover 24, a vessel 20 may not include any apertures or recesses (or other means) through which items 90 may be accessed or dispensed.

Figure 10:
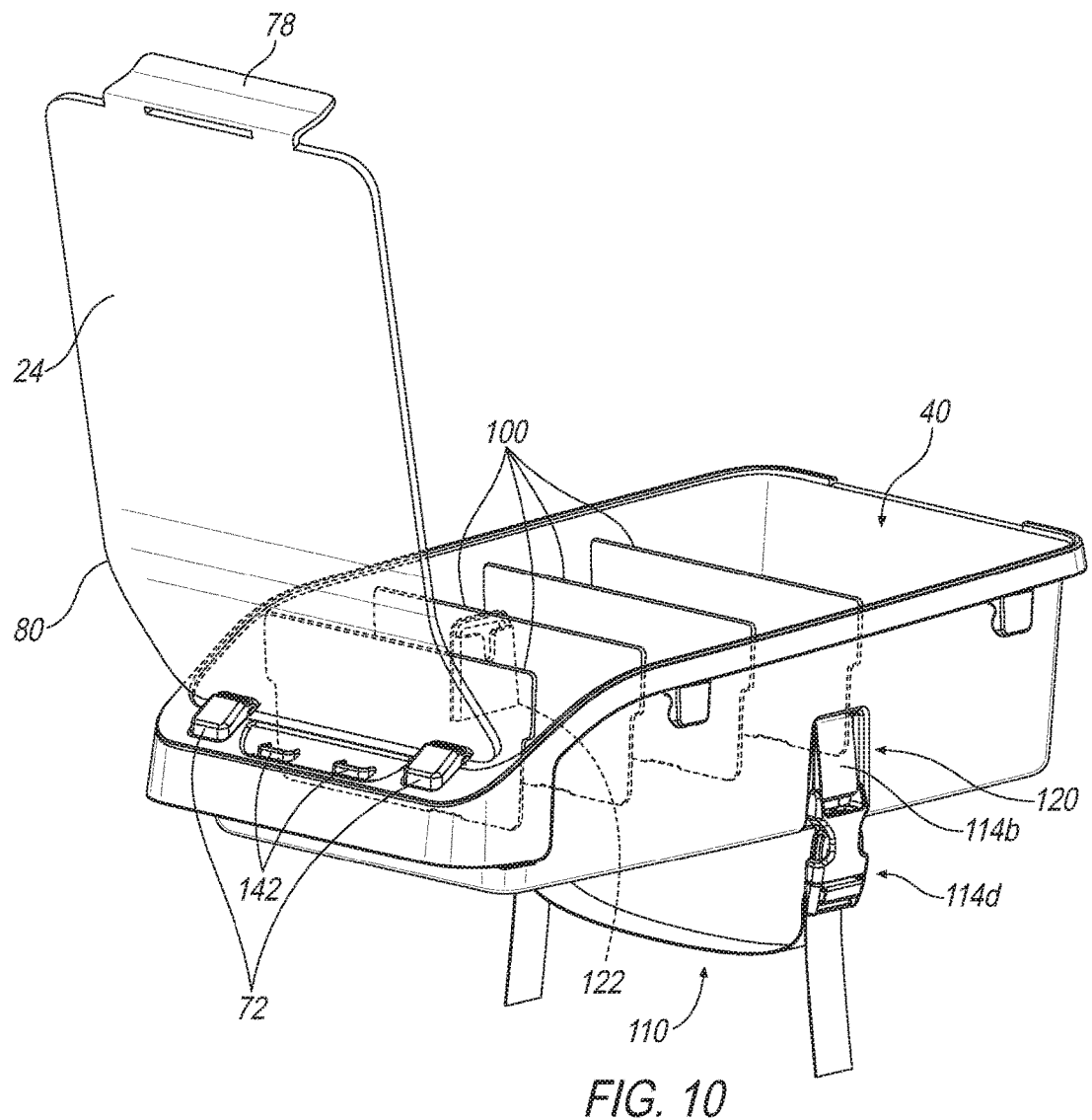
FIG. 10 is a perspective view generally illustrating an embodiment of a vessel according to teachings of the present disclosure.
Figure 12:
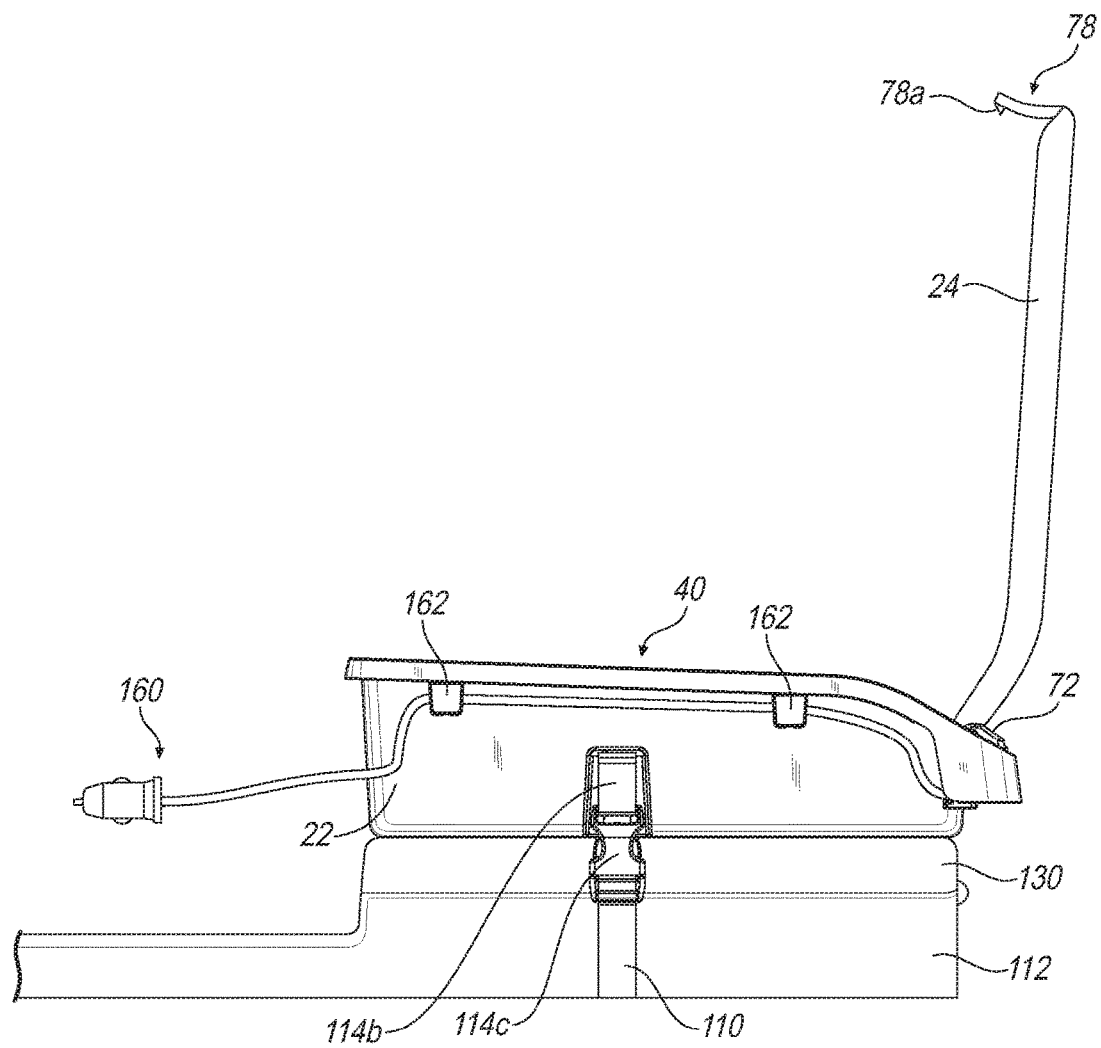
FIG. 12 is a side view generally illustrating an embodiment of a seat assembly according to teachings of the present disclosure.

A cover 24 may include one or more open positions in which the cover 24 may be partially or entirely open. An open position of a cover 24 may include the cover 24 being removed, such as generally illustrated in FIG. 5, and/or may include the cover 24 being rotated open from the front (e.g., if the flange 78 is disconnected and the cover 24 rotates via connectors 72), such as generally illustrated in FIGS. 10 and 12. In open positions of the cover 24, the chamber 40 may be accessible by an occupant, such as a driver. While the cover 24 is connected to the housing 22, such as if the cover 24 is closed or is at least connected via the connectors 72, a passenger of a vehicle 52 may not be able to access the chamber 40 or any items 90 therein. The connectors 72 may limit the movement (e.g., rotation) of the cover 24.

Figure 14:
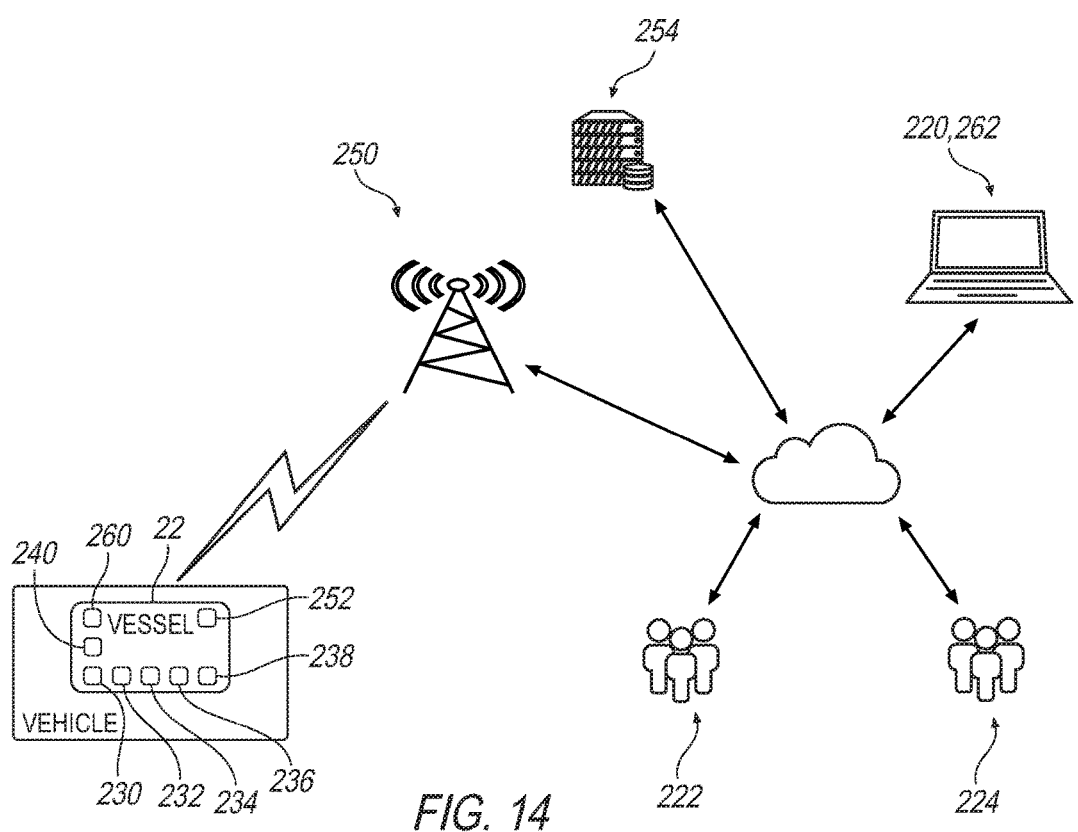
FIG. 14 is a schematic view generally illustrating an embodiment of a vessel connected to a communication network.

As generally illustrated in FIG. 14, a vessel 20 may be smart and include one or more sensors. For example and without limitation, a smart vessel may include a location sensor 230, a temperature sensor 232, a cover position sensor 234, an acceleration sensor 236, a camera 238, a light sensor 240, and/or other sensors. A location sensor 230 may be configured to determine a position of the vessel 20 and may include a GPS (global positioning system) device. A temperature sensor 232 may be connected to the housing 22 and may be configured to sense a temperature of the housing 22, such as an internal temperature of the chamber 40. A cover position sensor 234 may be configured to determine a position of the cover 24, such as whether the cover 24 is closed, open, and/or somewhere between closed and fully open. An acceleration sensor 236 may sense the acceleration and/or movement of the vessel 20. A camera 238 may be configured to obtain images and/or video of the vessel 20, items 90 in the vessel 20, and/or the environment of the vessel 20.

A light sensor 240 may be configured to sense an amount of light in a chamber 40, which may be used in connection with controlling one or more lights 144. For example and without limitation, one or more lights 144 may illuminate items 90 in a chamber 40 if the amount of light in the chamber 40 is below a threshold and/or may not illuminate items 90 if the amount of light in the chamber 40 is at or above the threshold. The one or more sensors may be connected (e.g., physically and/or electrically) to the circuit board(s) 140.

As generally illustrated in FIG. 14, a vessel 20 may be configured to communicate with and/or may be part of a communication network 250. A vessel 20 may include and/or be connected to a wireless communication device 252 (e.g., receiver, transmitter, transceiver, etc.). The wireless communication device 252 may be configured to communicate via one or more types of wireless networks, methods, and/or protocols (e.g., Bluetooth, cellular, WAN or wide area network, dedicated short range communication or DSRC, lower power wide area network or LPWAN, LoRa, LoRaWAN, and/or WiFi, among others). The wireless communication device 252 may be configured to transmit information about the vessel 20 (e.g., information from the one or more sensors) to a remote location, such as to a remote computer server 220.

A vessel 20 may be configured to communicate with a computer server 220, such as via the wireless communication device 252. The wireless communication device 252 may send information (e.g., small packets of data) from the vessel 20 to the computer server 220. Information from a vessel 20 may include information from one or more sensors, such as, a location sensor 230, a temperature sensor 232, a cover position sensor 234, an acceleration sensor 236, a camera 238, and/or a light sensor 240, among others. The computer server 220 may be connected to and/or include a storage device 254. The information from the vessel 20 may be stored on the storage device 254. The computer server 220 may be configured to analyze the information from the vessel 20, which may include determining certain performance metrics and actions and/or comparing information from a plurality of vessels 20. The computer server 220 may be configured to update firmware of a vessel 20 via the wireless communication device 252. With embodiments, wireless communication device 252 may or may not be utilized in connection with an occupant purchasing items 90.

A vessel 20 may not include any springs, coil springs, metal springs, and/or may not include any actuation devices (e.g., motors, pistons, cylinders, etc.) configured to modify (e.g., automatically) the position of items 90 in a housing 22. A vessel 20 may be configured to restrict and/or substantially prevent movement of items 90 that may be disposed in a chamber 40 at least when a cover 24 is in a closed position.

A circuit board (e.g., circuit board 140) and/or a computer server (e.g., the computer server) may include an electronic control unit or ECU 260, 262 that may include an electronic controller and/or include an electronic processor, such as a programmable microprocessor and/or microcontroller. In the embodiments, an ECU 260, 262 may include, for example, an application specific integrated circuit (ASIC). An ECU 260, 262 may include a central processing unit (CPU), a memory, and/or an input/output (I/O) interface. An ECU 260, 262 may be configured to perform various functions, including those described in greater detail herein, with appropriate programming instructions and/or code embodied in software, hardware, and/or other medium. An ECU 260, 262 may include a plurality of controllers. In embodiments, an ECU 260, 262 may be connected to a display, such as a touchscreen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

It should be understood that an electronic control unit (ECU) and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having both ROM, RAM, a combination of non-volatile and volatile (modifiable) memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute one or more processors, multiple processors that are integrated into a single system or are distributed over and connected together through a communications network, and/or where the network may be wired or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A vessel for a vehicle, the vessel comprising:
a housing configured for connection with said vehicle, the housing configured to receive a plurality of consumer items, the housing including a side wall with a recess portion, a first connector is secured to said side wall adjacent said recess portion;

a cover connected to the housing, the cover including a closed position in which the cover restricts vehicle occupant access to said plurality of consumer items and an open position in which the cover permits vehicle driver access to said plurality of consumer items ; and a second connector with a strap portion, the first connector and second connector are operable to releasably connect said vessel from a vehicle.

2. The vessel of claim 1, including the plurality of consumer items, wherein the plurality of consumer items includes at least ten consumer items.

3. The vessel of claim 1, wherein a width of the housing is less than or substantially equal to a distance between seats of said vehicle.

4. The vessel of claim 1, wherein one of said connectors is configured to connect the housing to a center console of a vehicle.

5. The vessel of claim 1, including one or more lights disposed in the housing and configured to illuminate the plurality of consumer items.

6. The vessel of claim 1, wherein in the open position of the cover, the cover restricts vehicle passenger access to said plurality of consumer items.

7. The vessel of claim 1, wherein the housing includes one or more charging ports.

8. The vessel of claim 1, including a plurality of dividers disposed in the housing, the dividers configured to divide the housing into a plurality of chambers configured to receive one or more of the plurality of consumer items.

9. The vessel of claim 8, wherein at least one of the plurality of dividers includes a recess configured to at least partially receive a protrusion of the housing, and the protrusion of the housing corresponds to a mounting location of a connecting member configured to connect the housing with a center console of said vehicle.

10. The vessel of claim 1, wherein the housing does not include any actuation devices configured to move any of said consumer items.

11. The vessel of claim 1, wherein a width of the housing is less than or substantially equal to a distance between seats of said vehicle, a height of the housing is less than the width of the housing, and a length of the housing is greater than the width of the housing.

12. The vessel of claim 1, wherein restricting vehicle occupant access includes preventing access by a driver and by passengers.

13. The vessel of claim 1, including a circuit board, one or more charging ports, and one or more lights.

14. A vessel, comprising:
 a housing configured for connection with a vehicle, the housing configured to receive a plurality of consumer items;
 a cover connected to the housing, the cover including a closed position in which the cover restricts vehicle occupant access to said plurality of consumer items and an open position in which the cover permits vehicle driver access to said plurality of consumer items;
 a circuit board connected to the housing, the board accommodating a light, a light pipe and a charging port; and
 a wireless communication device connected to the circuit board and configured to provide wireless communication between the circuit board and one or more remote and/or mobile electronic devices.

15. The vessel of claim 14, wherein the one or more remote and/or mobile electronic devices includes a mobile electronic device of an occupant of said vehicle.

16. The vessel of claim 14, wherein the one or more remote and/or mobile electronic devices includes a mobile electronic device of a passenger of said vehicle, a mobile electronic device of a driver of said vehicle, and a remote computer server.

17. The vessel of claim 14, including a first sensor configured to sense a position of the cover, a second sensor connected to the housing and configured to sense a location of the housing, a temperature sensor connected to the housing configured to determine an internal temperature of the housing, and a camera connected to the housing and configured to obtain at least one of images and video of said plurality of consumer items.

18. A seat assembly for a vehicle, the seat assembly comprising:
 a first seat;
 a second seat;
 a console disposed at least partially between the first seat and the second seat; and
 a vessel releasably connected to the console, the vessel including:
 a housing configured for connection with said vehicle, the housing configured to receive a plurality of consumer items;
 a disconnect system that is operable to release the vessel from the console of a vehicle, the disconnect system including a first portion, second portion, and a third portion, the first portion is connected to the housing, the second portion includes a first end and a second end, the first end is connectable to the first portion, the second end is connectable the third portion, the third portion is adjustable and permits the vessel to be secured relative to the console; and
 a cover connected to the housing, the cover including a closed position in which the cover restricts vehicle occupant access to said plurality of consumer items and an open position in which the cover does not restrict vehicle occupant access to said plurality of consumer items.

19. The seat assembly of claim 18, wherein the vessel is connected to rotate with a lid of the console.

20. The seat assembly of claim 18, wherein the housing includes a circuit board, one or more charging ports, and one or more lights.

21. A vessel comprising:
 a housing configured for connection with said vehicle, the housing configured to receive a plurality of consumer items;
 a cover connected to the housing, the cover including a closed position in which the cover restricts vehicle occupant access to said plurality of consumer items and an open position in which the cover permits vehicle driver access to said plurality of consumer items; a first sensor configured to sense a position of the cover;
 a second sensor connected to the housing and configured to sense a location of the housing;
 a temperature sensor connected to the housing configured to determine an internal temperature of the housing; and
 a camera connected to the housing and configured to obtain at least one of images and video of said plurality of consumer items.

* * * * *